(12) United States Patent
Lafleur et al.

(10) Patent No.: US 7,452,515 B1
(45) Date of Patent: Nov. 18, 2008

(54) SYSTEM FOR CREATING A BIOFUEL

(75) Inventors: Christof Lafleur, Vienna (AT); Harry Bouknight, Jr., Richmond, TX (US); Harry Bouknight, Sr., Clinton, TX (US)

(73) Assignees: Biofuels Allied, Inc., Houston, TX (US); Powertech International Holding AG, Stans (CH)

( * ) Notice: Subject to any disclaimer, the term of this patent is extended or adjusted under 35 U.S.C. 154(b) by 0 days.

(21) Appl. No.: 11/935,514

(22) Filed: Nov. 6, 2007

(51) Int. Cl.
*B01J 19/00* (2006.01)
*B01J 19/26* (2006.01)

(52) U.S. Cl. .................. 422/189; 422/188; 422/224

(58) Field of Classification Search .............. None
See application file for complete search history.

(56) References Cited

U.S. PATENT DOCUMENTS

| | | | |
|---|---|---|---|
| 5,525,126 A * | 6/1996 | Basu et al. ............... 44/308 |
| 5,578,090 A | 11/1996 | Bradin | |
| 5,713,965 A | 2/1998 | Foglia et al. | |
| 5,844,111 A * | 12/1998 | Granberg et al. ......... 554/184 |
| 6,127,560 A * | 10/2000 | Stidham et al. ........... 554/167 |
| 6,174,501 B1 | 1/2001 | Noureddini | |
| 7,045,100 B2 | 5/2006 | Ergun et al. | |
| 7,247,739 B2 | 7/2007 | Gapes et al. | |
| 2007/0175092 A1 * | 8/2007 | Ames .................... 44/629 |

FOREIGN PATENT DOCUMENTS

WO WO 2007049979 A1 * 5/2007

* cited by examiner

*Primary Examiner*—Jennifer A Leung
(74) *Attorney, Agent, or Firm*—Buskop Law Group, PC; Wendy Buskop (57) ABSTRACT

A system for making a biodiesel fuel using a biofuel reactor with at least one chamber and at least a two atomizers in each chamber, at least one atomizer with biofuel feedstock nozzles, and a second atomizer with alcohol with catalyst nozzles to simultaneously atomize and quickly react the biofuel feedstock with the alcohol with catalyst. A polyol separator separates the microparticles into a crude polyol stream and a crude biodiesel stream, and a conduit with an inlet introduces water to the crude biodiesel stream. A separator is used to separate a first portion of water from the crude biodiesel stream forming a washed crude biodiesel with a second portion of washing water, and a heat exchanger is used to form dried biodiesel and wash water vapor. A cooler cools the dried biodiesel, and a filter is used to remove particles from the cooled biodiesel forming the biodiesel.

22 Claims, 6 Drawing Sheets

SYSTEM FOR CREATING A BIOFUEL

FIELD

The present embodiments relate to trans-esterification of oils, fats, that is, the esters of glycerine and other polyols with fatty acids, and also fatty acids, by atomization of particles and introduction of one or more alcohols with a catalyst.

BACKGROUND

A need exists for a system to modify fats using very fast reaction times for trans-esterification.

A further need exists for a system capable of recycling at least a portion of the treated material, the fatty acids, to ensure the transformation to the biodiesel is complete.

A need exists for a pretreatment processes for fatty acids, like vegetable fats, enabling the atomization with trans-esterification to process smoothly without clogging.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus of the system is not limited to the particular embodiments and that it can be practiced or carried out in various ways.

The present embodiments relate to a system for creating a biodiesel fuel.

An embodiment contemplates using a biofuel feedstock for trans-esterification and acid esterification.

The biofuel reactor usable herein is for the trans-esterification and acid esterification of the biofuel feedstock using atomized particles.

In particular, the biofuel feedstock can be passed through a plurality of light phase biofuel feedstock nozzles in individual atomizers then, into a chamber simultaneously with the introduction of a short chain alcohol, which can be methanol in an embodiment. Other alcohols can be used, such as ethanol in additional embodiments.

The short chain alcohol can be mixed with a catalyst prior to introduction to a short chain alcohol with catalyst nozzle, (herein referred to as SCACN nozzle), or the catalyst and the short chain alcohol can be introduced to and through the SCACN nozzle simultaneously.

A preferred catalyst for use with the short chain alcohol is potassium hydroxide, at a concentration of about 88 percent by weight to 98 percent by weight. Other catalysts, such as those made by Dow Chemical Company with a chlor-alkali process, are also contemplated as usable catalysts herein.

In the chamber with the atomizers, a light phase biofuel feedstock and the short chain alcohol with catalyst are essentially formed into a mist, like a fog, in the chamber by the atomizer(s).

Each atomizer is contemplated to have at least two nozzles, but more nozzles per atomizer are contemplated herein, such as between 3 nozzles and 24 nozzles. Each atomizer is supplied from a particular source, that is, one atomizer can spray light phase biofuel feedstock through the nozzles while another sprays short chain alcohol with catalyst. The nozzles can be directed toward each other for maximum mixing in very short time intervals.

In addition to the biofuel feedstock and short chain alcohol with catalyst atomizers, a recycle atomizer with a set of nozzles is contemplated for use herein.

Each nozzle can support a differential pressure drop between 4 bar and 10 bar. The nozzles can have different diameters, between 1 millimeter and 4 millimeters, in a preferred embodiment. The nozzles can be generally round, presenting a conical spray of atomized particles.

The biofuel reactor is contemplated to be made of a coated steel for acid esterification purposes.

A biofuel reactor usable herein is contemplated to have one chamber with an overall diameter of between 12 inches and 24 inches and an overall height of between 3 feet and 6 feet.

It is contemplated that multiple biofuel reactors can be connected in parallel to each other to achieve a higher volume throughput in forming a biofuel.

Even when the biofuel reactors are connected together, it is contemplated that each biofuel reactor can act independently of another.

In an embodiment, it is contemplated that the biofuel reactor is modular, having removable and replaceable atomizers and nozzles, making it easy to repair the atomizers and nozzles in the field and to expand or contract individual biofuel reactors based on the capacity needed at any time.

The versatility of the biofuel reactor will save energy tremendously, which currently is a problem in the production of biodiesel, causing the high cost for biodiesel due to high energy demands for the process.

The atomization feature of the biofuel reactor will enable full conversion of biofuel feedstocks to biodiesel, approaching 100 percent conversion, continuously, in extremely short periods of time, such as less than 10 seconds of residence time in the chamber of the biofuel reactor.

The biofuel reactor is used to create a fog like stream of microparticles, which essentialy range in diameter from 1 micron to 50 microns, with preferred diameters being between 1 micron and 15 microns, and as small as 10 microns for certain biofuel feedstocks.

In an embodiment of the biofuel reactor, it is contemplated that the diameter of the atomized light phase biofuel feedstock is substantially the same diameter as the atomized short chain alcohol with catalyst. It is an object of an embodiment to match particle size as closely as possible to optimize reaction time in the chamber of the biofuel reactor.

In another embodiment, it is contemplated that up to 20 percent less volume of the short chain alcohol with catalyst could be used compared to the volume of light phase biofuel feedstock used.

From the biofuel reactor, the process is continuous. In an embodiment, the continuous process can be extremely flexible and versatile in that biofuel reactor nozzles and reactor bodies can be switched out and changed in size, depending on the flow rate and capacity needs of a customer. Further, the quantity of atomizers in the biofuel reactor chamber can be changed depending on the needs of the customer. A customer might need 30 nozzles with one biofuel feedstock and only 10 nozzles with a different biofuel feedstock.

A benefit of the biofuel reactor is the ability to clean in place the reactor atomizers, including all the nozzles, using an inert gas backflush, such as a nitrogen or argon backflush.

A tremendous benefit of the system is the ability to easily change biofuel feedstocks online, using the same overall system due to the option for use of an online pretreatment system with the biofuel reactor. It is contemplated that the pretreatment option also provides continuous flow into the biofuel reactor. The system also provides the benefit of allowing a user to mix biofuel feedstocks and create usable biodiesel, such as using a mixed stream of animal fat feedstock with a corn or soybean oil feedstock.

Another benefit of the system is that the system allows extremely high yield, up to 100 percent.

From the biofuel reactor, a crude biodiesel polyol mixture is transported to a polyol separator to separate the stream of microparticles into a crude polyol stream, substantially made of a mixture of glycerol and methanol, with more glycerol than methanol, that varies in quantity of each component depending on the type of feedstock used.

The separator produces a crude biodiesel stream which contains some alcohol, water, some polyol, such as glycerine, and perhaps less than 5 percent other impurities.

From the polyol separator, a conduit flows the crude biodiesel stream to a wash water separator. During the flowing, fresh wash water, which can be at ambient temperature, flows from a wash water inlet into the crude biodiesel stream, and the two components mix together in the conduit. The polyol separator can be a gravity separator, such as those made by Franken of Germany.

A first mixer can be placed in the conduit after the fresh wash water is introduced to the crude biodiesel stream for insuring complete, up to 98 percent, or possibly even 100 percent mixing and washing of the crude biodiesel stream, which can enable removal of practically all impurities from the crude biodisel stream, such as potassium, mono-glycerides, and di-glycerides.

An example of the conduit that is used between the polyol separator and the wash water separator can have a diameter 50 percent larger than joining segments, which permits ease of dosing of the crude biodiesel stream with fresh wash water.

It is expected that about 5 percent to about 10 percent by weight of fresh wash water, based on 100 percent fluid flow in the conduit, flows into the crude biodiesel stream prior to reaching the wash water separator.

The wash water separator divides the crude biodiesel stream mixed with fresh wash water into a first portion of wash water and a washed crude biodiesel with a second portion of washing water. It is expected that about 2 percent by weight of water is left in the washed crude biodiesel stream, once the first portion of wash water is separated after washing.

It is contemplated in an embodiment to use a coalescing type separator, such as those made by American Pal of the United States, or by Franken of Germany. Alternatively, a centrifugal separator can be used, available from Alfa Laval of the United States or Flottweg of Germany.

The washed crude biodiesel with a second portion of washing water then flows into a portion of a heat exchanger, such as a shell and tube heat exchanger, wherein the washed crude biodiesel with a second portion of washing water enters a tube and is heated by steam from a boiler in an adjacent chamber. The steam heats the washed crude biodiesel with a second portion of washing water, forming a dried biodiesel. Wash water vapor separates from the dried biodiesel and is transferred for use in another portion of the system. It is contemplated that the dried biodiesel is not heated over 135 degrees Centigrade, and typically will be around 110 degrees Centigrade, which is less than the vaporization temperature of the dried biodiesel.

A cooler, which can be a single unit, such as a plate and frame heat exchanger, cools the dried biodiesel to 20 degrees Centigrade or cooler. The cooler can be a combination of a shell and tube heat exchanger or a plate and frame heat exchanger with a cooler, for reducing the temperature of the dried biodiesel to 20 Centigrade.

A cooler, such as those coolers available from GEA, having offices in Germany, Alpha Laval of Sweden, or Schmidt of Austria, are examples of usable coolers that can receive the dried biodiesel and form a cooled biodiesel. In an additional embodiment, the heat exchanger for cooling the dried biodiesel can be used with the washed crude biodiesel to save energy costs of the entire system, which is a significant cost saving feature of the system.

Once cooled, a filter removes particles from the cooled biodiesel, forming the final biodiesel product. The filter can be a pocket filter, also known as a bag filter. The filter can have, in one example, a mesh size of up to 10 micrometers and remain usable herein.

The above description is hereinafter referred to as the "main bioreactor process." A pretreatment process that will occur prior to initiating the main bioreactor process and a secondary process treatment, which occurs in part while the main bioreactor process is ongoing, will also be described.

Different benefits are attributable to each of these three processes, the main bioreactor process, the secondary process treatment, and the pretreatment process.

The benefits for the secondary process treatment include the benefit of recovery of all materials of the system so there are no emissions into the environment. The system has the advantage of providing fertilizer using recovered potassium sulfate from the system, and glycerin for use in pharmaceuticals from the system, as either as a crude or industrial grade material. All water is recovered using the system, that is, there is no waste water or steam generated from the system that is not recovered. The system does not provide atmospheric pollution using the special treatment processes. The secondary process treatment also has the advantage of needing very low amounts of sulfuric acid and alcohol in the system.

Figure 1:
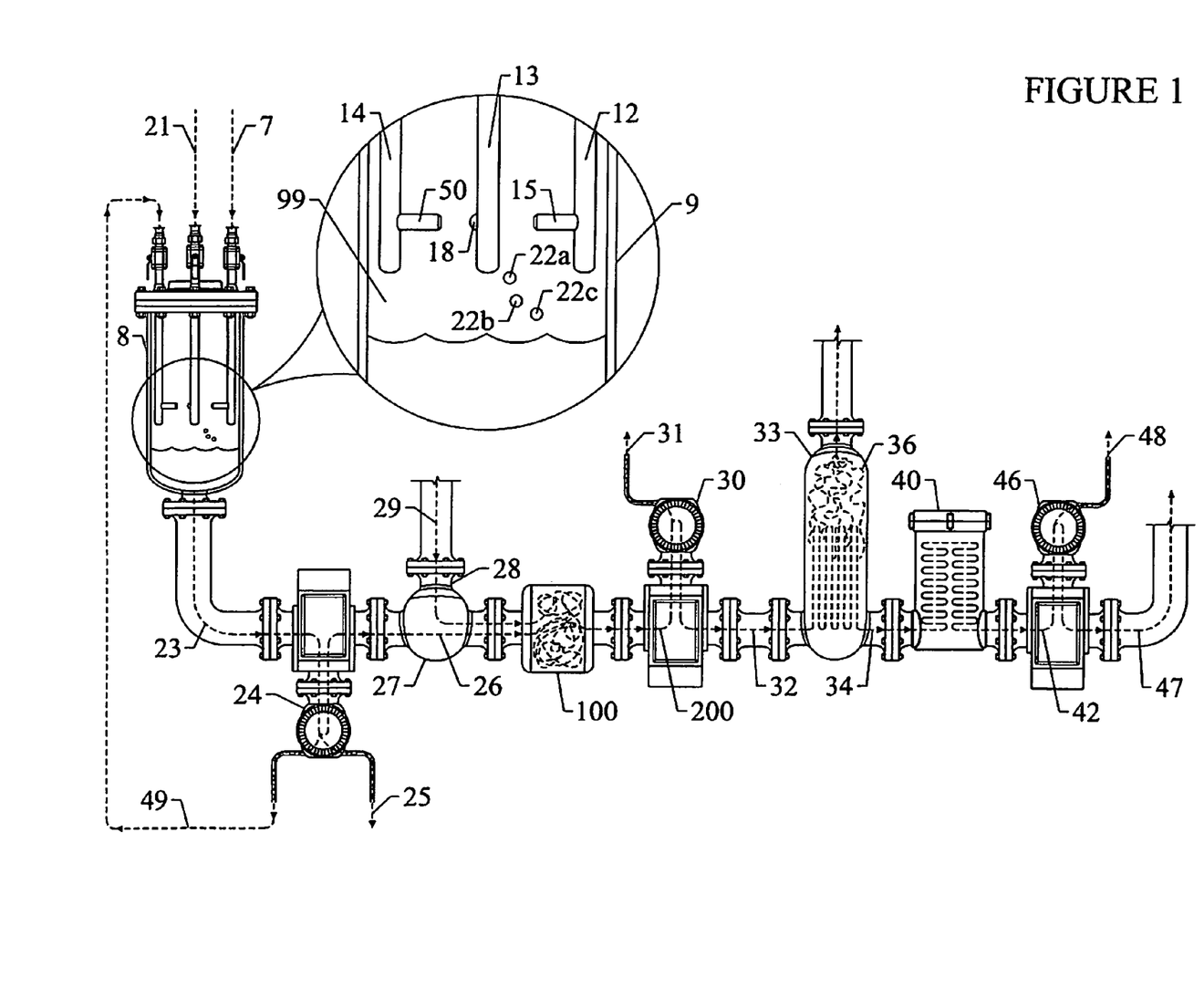
FIG. 1 is a diagram of the atomization and trans-esterfication process to form biodiesel.
Figure 2:
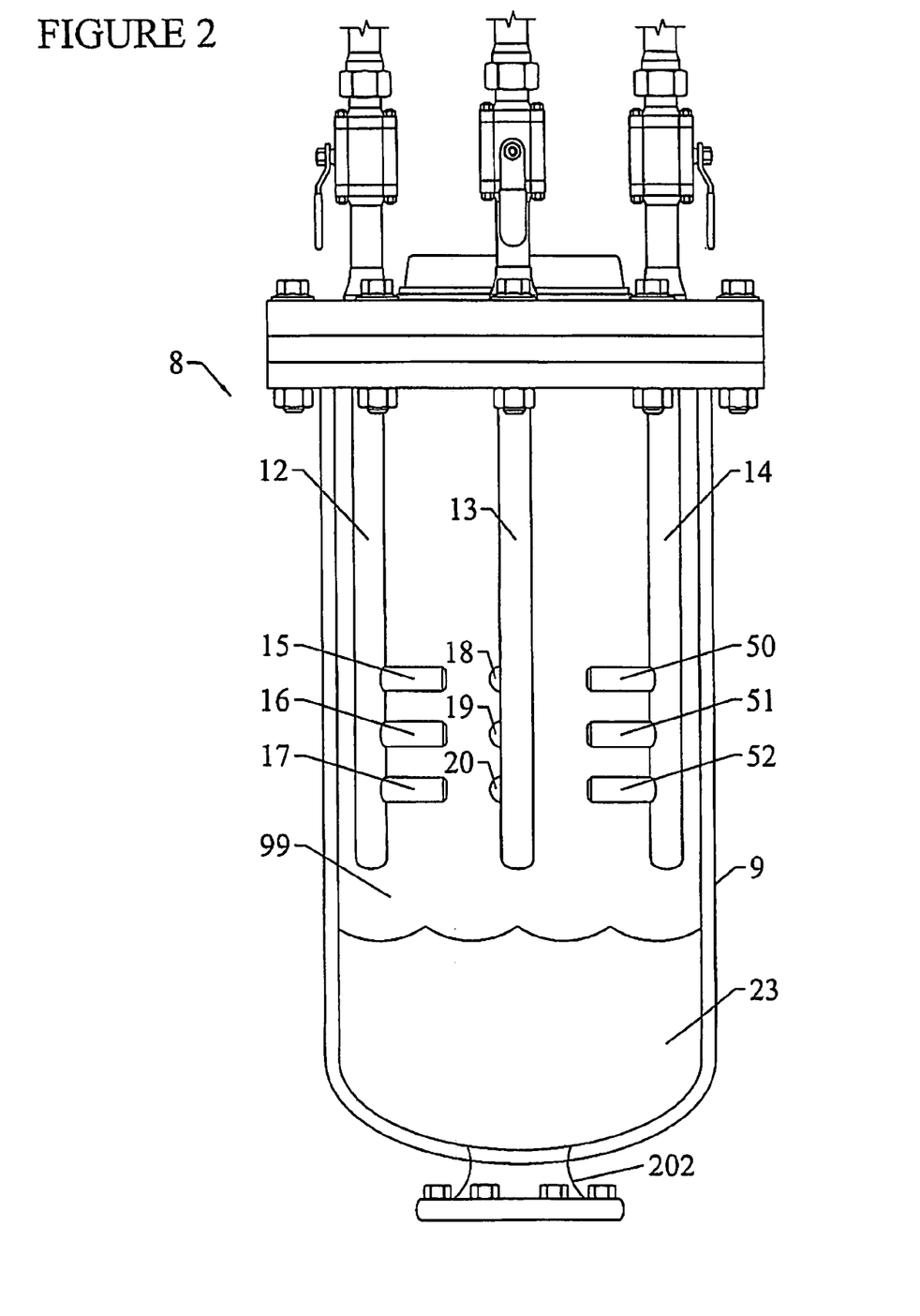
FIG. 2 is a detail of a bioreactor according to the invention.

Turning now to the Figures, FIG. 1 depicts the biofuel diesel production system using a biofuel reactor 8 with a first atomizer 12 for receiving light phase biofuel feedstock 7. FIG. 1 depicts one nozzle disposed on first atomizer 12, as nozzle 15, which is referred to herein as a light phase biofuel feedstock nozzle "LPBFN", but many nozzles can be used with each atomizer, as depicted in FIG. 2.

Nozzle 18 is a short chain alcohol catalyst nozzle, "SCACN" nozzle, which is shown secured to a second atomizer 13 for admitting a short chain alcohol with catalyst 21 to the chamber 9 of the biofuel reactor 8. Nozzles on atomizers for alcohol are herein referred to as SCACN.

Nozzle 50 is a recycle nozzle for a third atomizer 14, as this depicted embodiment contemplates having a recycle flow reinserted into the biofuel reactor 8 during this continuous process for optimized particle minimization and optimized use of all material from the light phase biofuel feedstock 7.

Through these nozzles of the atomizers, microparticles 22a, 22b and 22c are formed when the atomized light phase biofuel feedstock 7 contacts with atomized short chain alcohol with catalyst 21. The biofuel reactor 8 can further contain an inert gas 99, which can be nitrogen, contained in the chamber 9 for preventing an explosive atmosphere and reducing the risk of dangerous failure.

The microparticles 22a, 22b and 22c form a stream, and this stream of microparticles flows out of the biofuel reactor 8 to a polyol separator 24 as crude biodiesel polyol mixture 23.

FIG. 2 shows in more detail an embodiment of the biofuel reactor 8 having chamber 9. In the chamber, three atomizers are depicted as atomizers 12, 13, and 14 respectively.

Atomizer 12 has multiple light phase biofuel feedstock nozzles (LPBFN) 15, 16 and 17 for receiving and atomizing a light phase biofuel feedstock.

Atomizer 13 has multiple short chain alcohol with catalyst nozzles (SCACN) 18, 19 and 20, for receiving and atomizing a short chain alcohol with catalyst.

The atomizers 12 and 13 cause the light phase biofuel feedstock to simultaneously react with the short chain alcohol with catalyst in less than 1 minute, as short at 10 seconds, and in an embodiment, as short as 1 second.

These unique pressurized nozzles cause creation of microparticles simultaneously with very fast reactions, forming a stream of reacted microparticles, wherein each reacted microparticle has a diameter no greater than 50 microns, preferably less than 15 microns, and many simply with diameters of 10 microns or less.

In this FIG. 2, a third atomizer 14 is depicted for receiving a recycle stream 49 (depicted in FIG. 1) using recycle nozzles 50, 51 and 52, which can be the same size and pressure as the other nozzles.

Additionally, nitrogen is depicted as inert gas 99 and can be introduced through the nozzles. Crude biodiesel polyol mixture 23 is shown as a liquid in the reactor body. The level of the crude biodiesel polyol mixture 23 must be controlled to be below the first, second, and third atomizers, preventing flooding of the reactor, which would slow the reaction.

An outlet 202 is shown which can be used to flow the contents of the chamber 9 out of the biofuel reactor 8.

Figure 3:
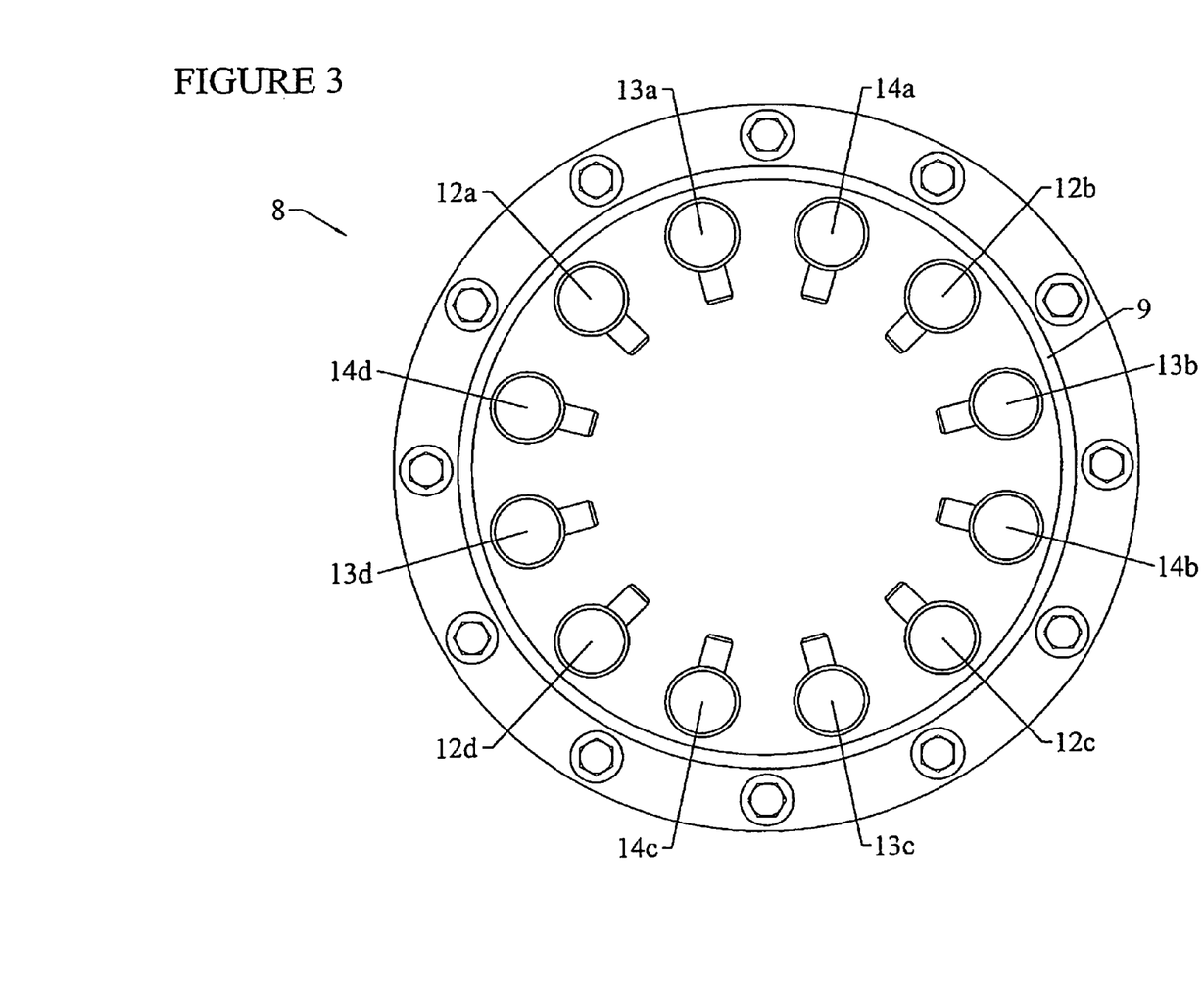
FIG. 3 is a top view of the biofuel reactor.

FIG. 3 is a detail of a top view of the biofuel reactor 8. In this FIG. 3, the chamber 9 is shown with four first atomizers 12a, 12b, 12c and 12d, four second atomizers 13a, 13b, 13c and 13d, and four third atomizers 14a, 14b, 14c, and 14d, for a total of 12 atomizers.

Between 2 atomizers and 12 atomizers are usable in an embodiment of the biofuel reactor. Each atomizer can have between 1 nozzle and 24 nozzles depending on the size of the nozzles. The atomizers are suspended by a lid that sealably engages a body of the reactor that forms the chamber holding the atomizers. The atomizers need to be suspended above the liquid levels in the biofuel reactor.

Returning now to FIG. 1, the polyol separator 24 is in fluid communication with the biofuel reactor 8. The polyol separator 24 is adapted to receive and separate the stream of reacted microparticles into a crude polyol stream 25 and a crude biodiesel stream 26.

In this embodiment, the crude biodiesel stream 26 is at a temperature of below 60 degrees Centigrade. The crude biodiesel stream 26 flows from the polyol separator 24 into a conduit 27.

When the ester content of the crude biodiesel stream is less than 96.5 percent, then at least a portion of the crude biodiesel stream is recycled as a recycle stream 49.

Fresh wash water 29, such as water produced by reverse osmosis, is introduced into the conduit 27 through a wash water inlet 28 to the crude biodiesel stream.

A first mixer 100 can mix, in an embodiment, the fresh wash water 29 and the crude biodiesel stream 26.

When ester content of the crude biodiesel stream exceeds 96 percent, at least once, the crude biodiesel stream is washed with fresh wash water 29, forming a washed crude biodiesel stream 200.

The crude biodiesel stream mixed with the fresh wash water flows to a wash water separator 30. The wash water separator 30 separates the fresh wash water 29 into a first portion of wash water 31 and a washed crude biodiesel with a second portion of washing water 32.

The ratio of water to crude biodiesel (water:crude biodiesel) can be between 1 pmm and 1500 pmm of water:crude biodiesel based on the feedstock used.

The washed crude biodiesel with a second portion of washing water 32 then flows to a heat exchanger 33 for heating the washed crude biodiesel with a second portion of washing water 32. The heat exchanger 33, without adding water to the washed crude biodiesel, heats the biodiesel, forming a dried biodiesel 34, without vaporizing the dried biodiesel, while vaporizing the wash water, forming a wash water vapor 36.

The dried biodiesel 34 is transferred to a cooler 40 for reducing the temperature of the dried biodiesel 34 to about 20 degrees Centigrade, forming a cooled biodiesel 42.

The cooled biodiesel 42 is then transferred to a filter 46, and particles 48 are removed as waste. The cooled filtered biodiesel is the final biodiesel product 47.

An embodiment of this system contemplates that the biofuel reactor can be a continuous flow reactor.

It should be noted that in an embodiment, at least one of the atomizers has a recycle nozzle for receiving a recycle stream that is simultaneously atomized and blended with the light phase biofuel feed stock and short chain alcohol with catalyst.

Figure 4:
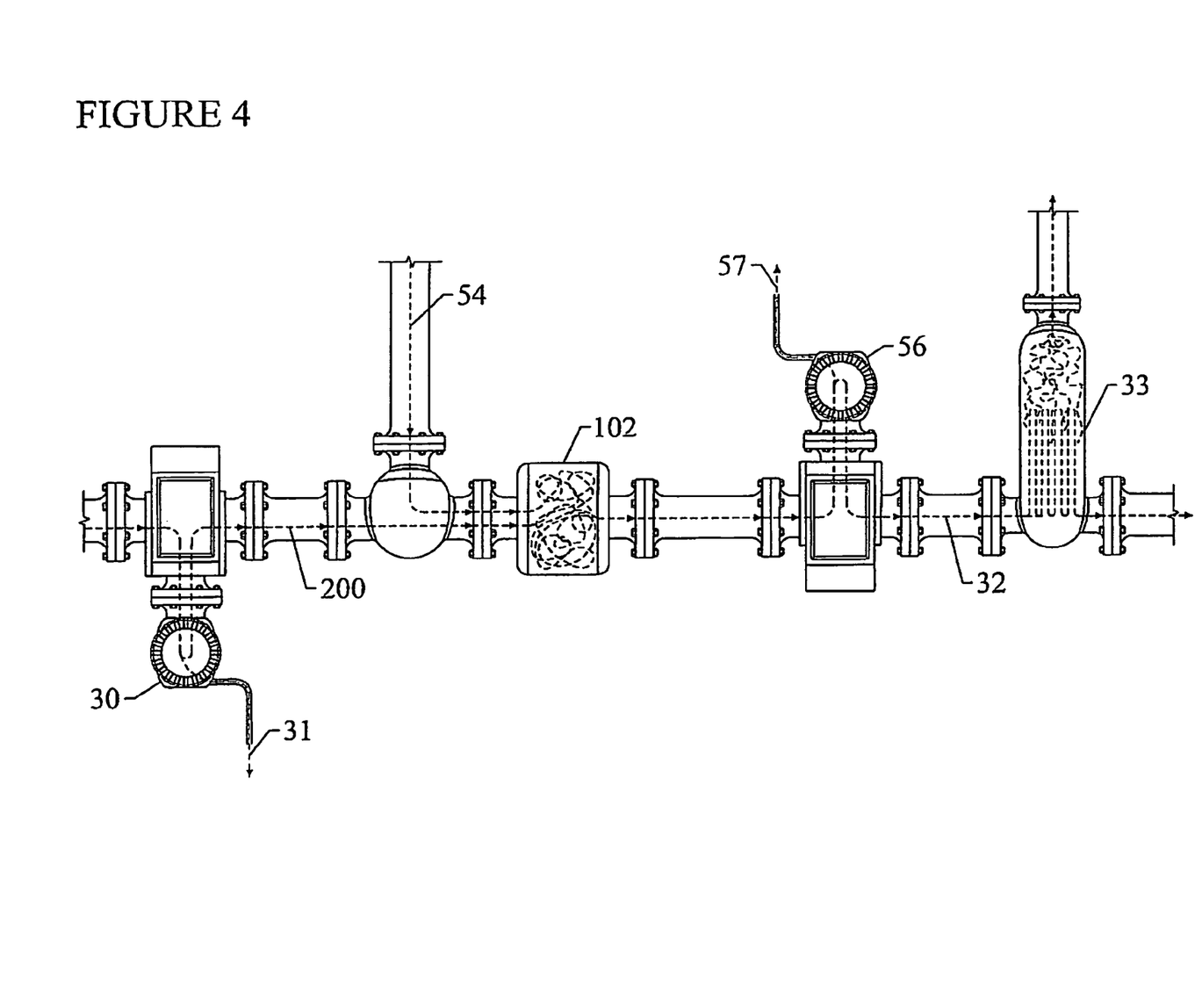
FIG. 4 provides a detail of an embodiment of the system using an additional acid wash and acid wash separator.

Another embodiment, which is detailed in FIG. 4 shows that an acidic water 54 can be introduced to the washed crude biodiesel stream 200 after it leaves the wash water separator 30. The acidic water 54 can be mixed with the washed crude biodiesel stream to remove potassium and remaining monoglycerides and diglycerides.

In this embodiment, the acid has a concentration between 2 percent by weight and 4 percent by weight. This type of acid can be sulfuric acid.

A second mixer 102 can be located between the wash water separator 30 and an acid wash water separator 56 for blending the acid with the washed crude biodiesel in a continuous flow manner.

Acidic wash water 57 is then removed from the biodiesel using the acid wash water separator 56. Washed crude biodiesel with a second portion of washing water 32 then flows to the heat exchanger 33.

Figure 5:
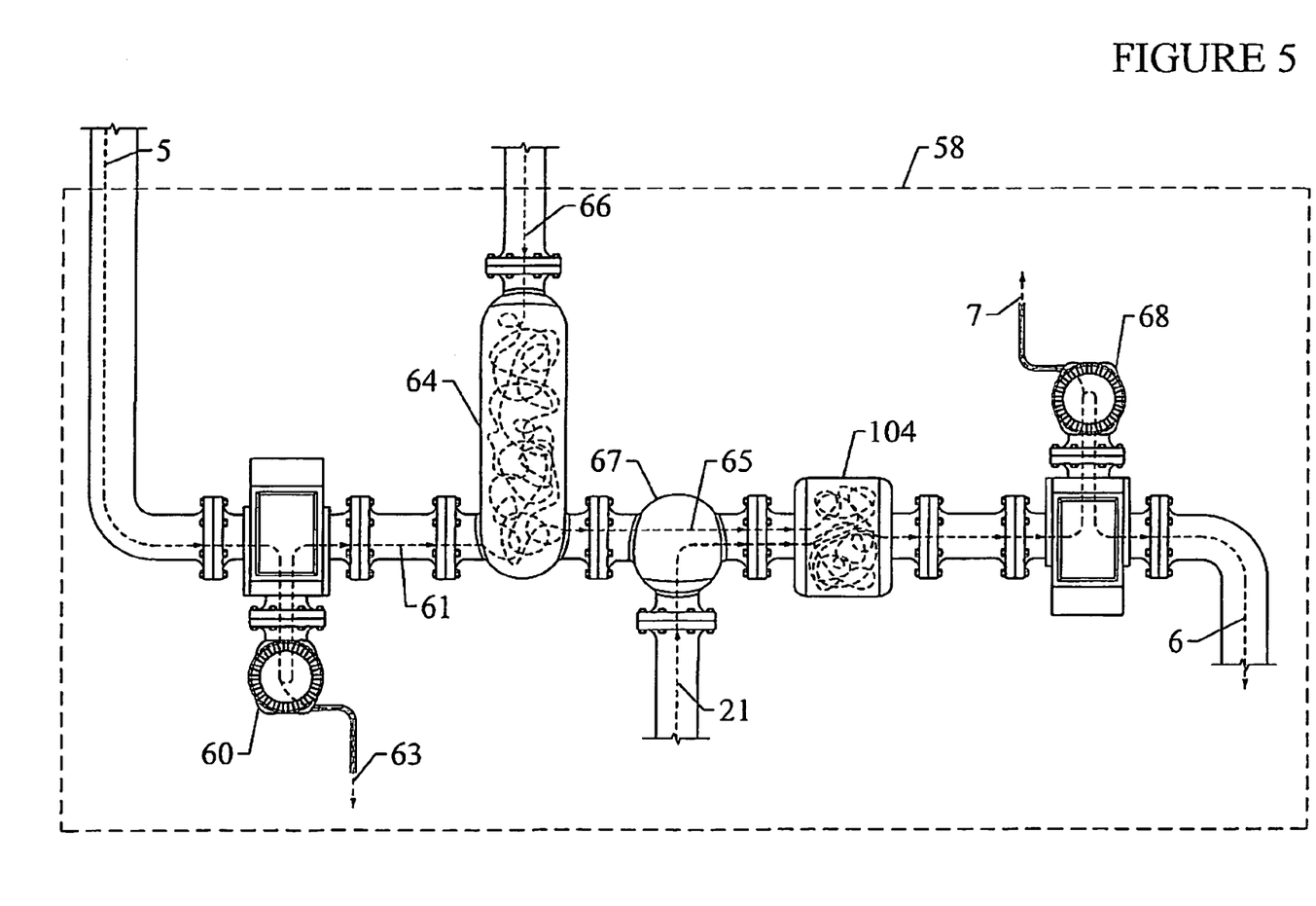
FIG. 5 provides a diagram of a pretreatment process usable with an embodiment of the invention with the bioreactor.

An embodiment of the system contemplates usage of certain pretreatment equipment 58 for modifying a biofuel feedstock 5, as shown in FIG. 5.

For pretreatment, the biofuel feedstock 5 is transferred to a pretreatment filter 60 for filtering particulates 63 having a diameter greater than 20 microns from the biofuel feedstock 5, forming a filtered product 61.

The filtered product 61 then is transferred to degumming apparatus 64, such as a pressure vessel with a stirrer. The degumming apparatus 64 treats filtered product 61 using a degumming acid 66, such as phosphoric acid having a concentration of at least 85 percent, forming degummed product 65. The degummed product 65 is transferred to a pretreatment conduit 67 for dosing with the short chain alcohol with catalyst 21.

The filtered product in this embodiment can be constantly monitored with sensors in communication with a user display device and a processor. The processor can have computer instructions in memory to alert a user when a phosphatide content of the filtered product is less than 20 ppm and then actuate saponification on the degummed product 65 by introducing a portion of the short chain alcohol with catalyst 21 to the degummed product 65.

A third mixer 104 is contemplated to be located between the pretreatment conduit 67 and soap separator 68 for significantly mixing the components.

The degummed product 65 in this FIG. 5 is then sent to a soap separator 68 for dividing the degummed product 65 into a light phase biofuel feedstock 7 and a heavy phase fluid flow 6. The heavy phase fluid flow 6 contains a fatty acid ester, in an embodiment.

The invention also contemplates using secondary process treatment equipment concomitant with the main bioreactor processor.

Figure 6:
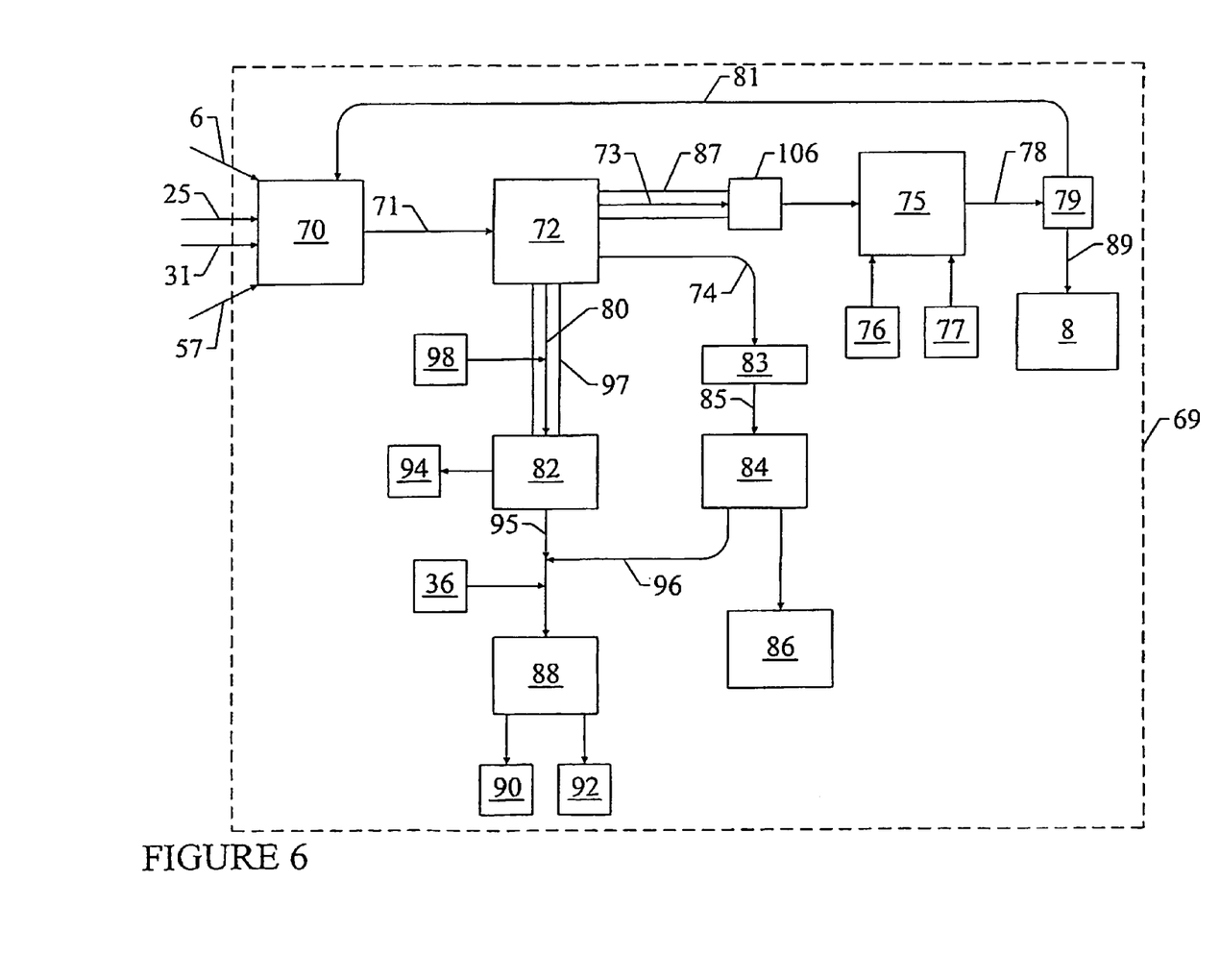
FIG. 6 is a detail of a secondary process treatment usable with the embodiment depicted in FIG. 1.

An embodiment of this secondary process treatment is depicted in FIG. 6, which depicts secondary process treatment equipment 69.

FIG. 6 shows a neutralization vessel 70 adapted to receive the crude polyol stream 25 and the first portion of wash water 31. In other embodiments, neutralization vessel 70 receives heavy phase fluid flow 6 from the pretreatment process described above, and the acid wash water 57, which is also described in an alternative embodiment. Additionally, recycle acid stream 81 can be transferred to the neutralization vessel 70.

In the neutralization vessel 70, all 4 or 5 of the above described streams can be contained. At least two of the streams, but up to all 5 of the streams can then be neutralized to a pH of between about 3.5 to 4.0, forming a neutralized mixture 71 with less than 25 percent acid.

The neutralized mixture 71 is then transferred to a phase separator 72. A phase separator 72 can be a decanter or a tricanter. The phase separator can be adapted to decant into at least two and up to three streams simultaneously that are received from the neutralization vessel. If three streams are tricanted, one can be a salt 80, another can be oil stream 73, and the third can be a crude polyol stream 74.

From the phase separator, the oil stream 73 is flowed to an acid esterification reactor 75 for a dosing of an esterification acid 76 with esterifing short chain alcohol 77. In an alternative embodiment, the oil stream 73 is inserted into an esterification conduit and dosings of esterification acid and esterifying short chain alcohol can be added directly to the conduit and mixed with an optional mixer to complete the acid esterification.

The esterification acid 76 can be sulfuric acid having a concentration of 1 percent to 2 percent. The esterifying short chain alcohol 77 can be an ethanol, a methanol, or combinations thereof, with a concentration between 20 percent by weight and 22 percent by weight.

Temperatures for the esterification reactor 75 are contemplated to be below 60 degrees Centigrade. The esterification reactor produces a mixture of a fatty acid ester and an acid/alcohol mixture 78.

The mixture of a fatty acid ester and an acid/alcohol mixture 78 is transferred to an acid esterification separator 79 for separating the crude fatty acid ester stream 89 and recycle acid stream 81.

The crude fatty acid ester stream 89 is recycled back to the biofuel reactor 8.

Optionally, an esterification conduit 87 can be used between the phase separator 72 and the acid esterification reactor 75 for administering doses of esterification acid and esterification short chain alcohol with a mixer 106.

A salt conduit 97 conveys salt 80 from the phase separator 72 to a salt dryer 82. In the salt conduit 97, a short chain alcohol for salt 98 is blended with the salt. From the salt dryer 82 is obtained dried salt 94 and a short chain alcohol water mixture 95. Dried salt 94 from the salt dryer can be used as fertilizer.

A polyol neutralizer 83 can be used to treat a crude polyol stream 74 from the phase separator 72. A polyol dryer 84 can be used after neutralizing for drying the neutralized crude polyol 85. The polyol dryer also forms a water alcohol stream 96 from the crude polyol stream 74 and forms final polyol product 86, which has a range of 70 percent to 90 percent purity of polyol, such as glycerine, depending on the market.

An alcohol rectification unit 88 can be used for separating the water alcohol stream 96 to recycle water 90 and alcohol 92 to the system.

Other embodiments of the system contemplate that the wash water vapor 36 obtained from the first portion of wash water 31 during the main reactor process can be introduced to the water alcohol stream 96 for alcohol rectification in the alcohol rectification unit 88.

Another embodiment contemplates that each atomizer has a recycle nozzle for recycling at least a portion of the light phase biofuel feedstock, which can be up to 50 percent by weight of the light phase biofuel feedstock.

It is considered that the short chain alcohol can be a methyl alcohol, an ethyl alcohol, a propyl alcohol, a butyl alcohol, a pentyl alcohol, and combinations thereof. Methanol and ethanol are contemplated to be particularly useful herein.

An embodiment contemplates that the ratio of the short chain alcohol to catalyst is between 10:1 and 25:1. Another embodiment contemplates that the ratio can range between 20:1 and 25:1 of the short chain alcohol to the catalyst.

The catalyst can be a potassium hydroxide, sodium hydroxide, and combinations thereof.

It should be noted that the biofuel feedstock is contemplated to be a triglyceride containing feedstock. The triglyceride containing feedstock can be a rapeseed oil, sunflower oil, soybean oil, palm oil, jatropha oil, cottonseed oil, white oil, another vegetable oil, animal fat, used cooking oil, and combinations of these oils.

An embodiment contemplates that at least one of the atomizers has one or more adjustable nozzles for insertion of an additional fluid. The additional fluid can be a vapor, a liquid, a gas, or combinations of these components. The chamber may operate under an inert atmosphere, such as a nitrogen blanket. It is also contemplated that the additional fluid of the adjustable nozzles of the atomizers could be an inert gas, such as nitrogen or argon.

While these embodiments have been described with emphasis on the embodiments, it should be understood that within the scope of the appended claims, the embodiments might be practiced other than as specifically described herein.

What is claimed is:

1. A system for creating a biodiesel fuel using main biodiesel production equipment comprising:
   (a) a biofuel reactor comprising:
       at least one chamber;
       at least two atomizers in the at least one chamber comprising:
           a first atomizer in the at least one chamber comprising at least one light phase biofuel feedstock nozzle for receiving and atomizing a light phase biofuel feedstock, and
           a second atomizer in the at least one chamber comprising at least one short chain alcohol with catalyst nozzle for receiving and atomizing a short chain alcohol with catalyst, wherein a stream of reacted microparticles is quickly formed when the atomized light phase biofuel feedstock contacts the atomized short chain alcohol with catalyst;

(b) a polyol separator in fluid communication with the biofuel reactor, wherein the polyol separator is adapted to receive and separate the stream of reacted microparticles into a crude polyol stream and a crude biodiesel stream;

(c) a conduit comprising:
a wash water inlet for introducing fresh wash water to the crude biodiesel stream, and flowing the crude biodiesel stream mixed with fresh wash water to a wash water separator, wherein the wash water separator is adapted to separate a first portion of wash water from the crude biodiesel stream to form a washed crude biodiesel with a second portion of washing water;

(d) a heat exchanger for heating the washed crude biodiesel with the second portion of washing water to form dried biodiesel and wash water vapor;

(e) a cooler for receiving the dried biodiesel and forming a cooled biodiesel;

(f) a filter for receiving the cooled biodiesel and removing particles from the cooled biodiesel to form a final biodiesel; and (g) a secondary process treatment equipment comprising:
a neutralization vessel adapted to receive the crude polyol stream, the first portion of the wash water, and a recycle acid stream, wherein the neutralization vessel is adapted to neutralize the crude polyol stream, wash water, and recycle acid streams to a pH of about 3.5 to 4.0 forming a neutralized mixture;
a phase separator for receiving the neutralized mixture and forming an oil stream and a second crude polyol stream;
an esterification conduit for dosing a short chain alcohol into the oil stream and for dosing an esterification acid into the oil stream;
an acid esterification reactor for esterifying the oil stream to form a mixture of a fatty acid ester and an acid/alcohol mixture;
an acid esterification phase separator for receiving the mixture of the fatty acid ester and the acid/alcohol mixture and forming the recycle acid stream and a crude fatty acid ester stream, wherein the crude fatty acid ester stream flows back to the biofuel reactor, wherein the recycle acid stream flows back to the neutralization vessel;
a polyol dryer for forming at least two components from the second crude polyol stream, including a water alcohol stream adapted to receive wash water vapor, and a final polyol product; and
an alcohol rectification unit for separating water and alcohol from the water alcohol stream.

2. The system of claim 1, wherein the biofuel reactor is a continuous flow reactor.

3. The system of claim 1, further comprising at least a third atomizer in the chamber of the biofuel reactor comprising at least one a recycle nozzle wherein the at least one recycle nozzle is adapted to receive at least one recycle stream for simultaneously atomizing and blending the at least one recycle stream with the light phase biofuel feed stock and the short chain alcohol with catalyst.

4. The system of claim 1, wherein an acidic water is introduced to the washed crude biodiesel, and the system further comprises an acid wash water separator for extracting acid wash water from the washed crude biodiesel with the second portion of washing water prior to flowing into the heat exchanger.

5. The system of claim 1, further comprising pretreatment equipment for modifying a biofuel feedstock comprising:
a pretreatment filter for filtering particulates from a biofuel feedstock to form a filtered product having a phosphatide content;
a degumming apparatus for:
treating the filtered product using a degumming acid when the phosphatide content of the filtered product is below 20 ppm to form a degummed product, and
allowing saponification of the filtered product using the short chain alcohol with catalyst when the free fatty acid content of the filtered product is greater than 1 percent;
a pretreatment conduit for transferring the degummed product and dosing a portion of short chain alcohol with catalyst into the degummed product; and
a soap separator for dividing the degummed product into the light phase biofuel feedstock and a heavy phase fluid flow.

6. The system of claim 1, wherein the neutralization vessel further receives heavy phase fluid flow from a pretreatment process for biofuel feedstock.

7. The system of claim 1, wherein the neutralization vessel further receives acid wash water.

8. The system of claim 1, wherein the short chain alcohol is a member of the group consisting of: a methyl alcohol, an ethyl alcohol, a propyl alcohol, a butyl alcohol, a pentyl alcohol, and combinations thereof.

9. The system of claim 1, wherein the ratio of short chain alcohol to catalyst in the short chain alcohol with catalyst is between 3:1 and 25:1 alcohol:catalyst.

10. The system of claim 9, wherein the catalyst is a member of the group consisting of: potassium hydroxide, sodium hydroxide, and combinations thereof.

11. The system of claim 1, wherein the biofuel feedstock is a triglyceride containing feedstock.

12. The system of claim 11, wherein the triglyceride containing feedstock comprises rapeseed oil, sunflower oil, soybean oil, jatropha oil, cottonseed oil, white oil, another vegetable oil, animal fat, used cooking oil, palm oil, and combinations thereof.

13. The system of claim 1, further comprising between 2 atomizers and 24 atomizers in each chamber.

14. The system of claim 1, wherein at least two chambers are connected together in parallel.

15. The system of claim 1, wherein at least one of the atomizers comprises an adjustable nozzle, a fixed nozzle or combinations thereof.

16. The system of claim 1, wherein an additional fluid is inserted into the at least one chamber using at least one nozzle.

17. The system of claim 16, wherein the additional fluid is an inert gas.

18. The system of claim 1, further comprising a plurality of mixers associated with the main biodiesel production equipment.

19. The system of claim 1, further comprising a recycle stream for use when the light phase biofuel feedstock comprises an animal fat, cooking oil and combinations thereof.

20. The system of claim 1, wherein the phase separator further separates a salt from the neutralized mixture, and a salt conduit conveys the salt with a short chain alcohol that is added to the salt to a salt dryer, wherein the salt dryer forms a dried salt and a short chain alcohol water mixture.

21. The system of claim 1, wherein the acid esterification reactor is further adapted to provide at least one dosing of esterification acid with an esterification short chain alcohol.

22. The system of claim 1, wherein the secondary process treatment equipment further comprises a polyol neutralizer for adding a short chain alcohol with hydroxide to the second crude polyol stream to form a neutralized crude polyol.

* * * * *